US006453270B1

(12) United States Patent
Durbin

(10) Patent No.: US 6,453,270 B1
(45) Date of Patent: Sep. 17, 2002

(54) SYSTEMS FOR REMOTE MANAGEMENT OF A NETWORK OF WASTE CONTAINERS

(75) Inventor: Martin J. Durbin, Oak Forest, IL (US)

(73) Assignee: One Plus Corp., Northbrook, IL (US)

( * ) Notice: Subject to any disclaimer, the term of this patent is extended or adjusted under 35 U.S.C. 154(b) by 39 days.

(21) Appl. No.: 09/930,663

(22) Filed: Aug. 15, 2001

Related U.S. Application Data

(62) Division of application No. 09/590,214, filed on Jun. 8, 2000, now Pat. No. 6,360,186.
(60) Provisional application No. 60/188,162, filed on Mar. 7, 2000.

(51) Int. Cl.[7] .......................... G08B 21/00; G06F 11/00
(52) U.S. Cl. ....................... 702/188; 340/346; 340/449; 340/612; 340/679
(58) Field of Search .......................... 702/188; 340/346, 340/449, 870.16, 10.41, 612, 679; 100/99; 705/22; 710/44, 46, 220; 370/449

(56) References Cited

U.S. PATENT DOCUMENTS 4,773,027 A * 9/1988 Neumann ............... 100/229 A
5,016,197 A * 5/1991 Neumann et al. ....... 100/229 A
5,173,866 A * 12/1992 Neumann et al. ....... 100/229 A
5,214,594 A * 5/1993 Tyler et al. ............. 100/229 A
5,299,493 A * 4/1994 Durbin et al. .............. 100/193
5,303,642 A * 4/1994 Durbin et al. .............. 100/193
5,558,013 A * 9/1996 Blackstone, Jr. ............ 100/218
5,963,920 A * 10/1999 Rose et al. .................... 705/22
5,967,028 A * 10/1999 Schomisch et al. ..... 100/229 A
6,003,441 A * 12/1999 Little ...................... 100/229 A
6,021,712 A * 2/2000 Harrop ................... 100/229 A
6,123,017 A * 9/2000 Little et al. ............. 100/229 A
6,148,291 A * 11/2000 Radican ........................ 705/22
6,360,186 B1 * 3/2002 Durbin ........................ 702/188

* cited by examiner

*Primary Examiner*—Patrick Assouad
(74) *Attorney, Agent, or Firm*—Wood, Phillips, Katz, Clark & Mortimer

(57) ABSTRACT

A system for remotely managing a network of waste containers (12), each of which is associated with a monitoring unit (38), utilizes a central computer (50) having a communication link to each monitoring unit (38). The central computer (50) provides a dynamically updated display, via a display module (60) having a full container window (or zone) which shows full containers (12), an alarm window (or zone) which shows non-full containers (12) having an alarm condition, and a container status window (or zone) which shows non-full containers not having an alarm condition.

3 Claims, 8 Drawing Sheets

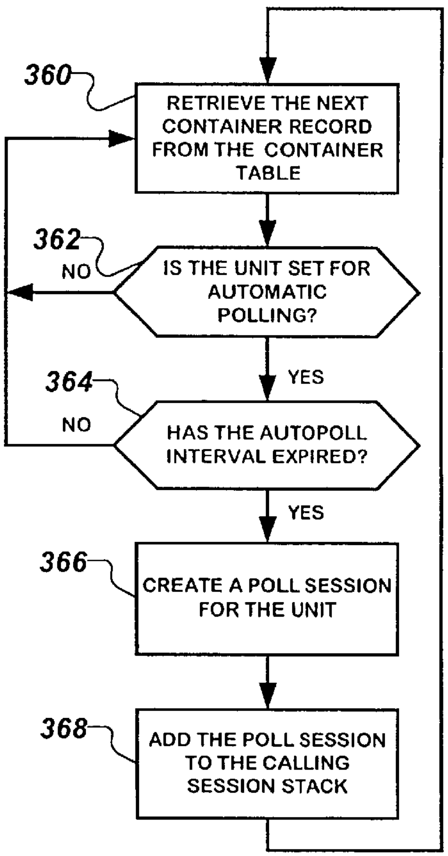

FIG. 9

POLLING SESSION

COMMAND TRANSMITTED FROM CENTRAL COMPUTER

| TEXT REQUEST | RETRIES | TIMEOUT | DESCRIPTION |
|---|---|---|---|
| < U | 02 | 3000 | REQUEST CONTAINER UNIT NUMBER |
| < M | 02 | 3500 | REQUEST CONTAINER COMPACTION PRESSURE |
| < C | 02 | 3500 | REQUEST CONTAINER NUMBER OF COMPACTIONS |
| : H | | | HANG-UP |

RESPONSE FROM MONITORING UNIT EXPECTED BY CENTRAL COMPUTER

| TEXT RESPONSE | DESCRIPTION |
|---|---|
| > Uxx | UNIT NUMBER IS xx |
| > Mxx | PRESSURE IS xx |
| > Cxxx | COMPACTIONS ARE xxx |

FIG. 12

SYSTEMS FOR REMOTE MANAGEMENT OF A NETWORK OF WASTE CONTAINERS

CROSS-REFERENCE TO RELATED APPLICATION(S)

Applicant hereby claims priority under 35 U.S.C. 119(e) based on provisional application Ser. No. 60/188,612, entitled "USER INTERFACE," filed by the present applicant on Mar. 7, 2000, the subject matter and entire writing of which are incorporated herein by reference.

CROSS-REFERENCE TO RELATED APPLICATIONS

This application is a division of U.S. patent application Ser. No. 09/590,214, which was filed on Jun. 8, 2000 now U.S. Pat. No. 6,360,186. U.S. patent application Ser. No. 09/590,214 claims the priority of U.S. Provisional Patent Application Serial No. 60/188,162, which was filed on Mar. 7, 2000.

STATEMENT REGARDING FEDERALLY SPONSORED RESEARCH OR DEVELOPMENT

Not applicable.

REFERENCE TO A MICROFICHE APPENDIX

Not applicable.

TECHNICAL FIELD

The invention relates generally to waste collection and removal systems. More particularly, the invention relates to systems for monitoring and managing the status of a number of waste containers, such as trash compactors, which are equipped with compacting assemblies, or open-top containers, which are not equipped with compacting assemblies, in a manner that permits a user to quickly determine at a central location the current status of all containers in the container network. The invention also relates to systems for managing communications between a central computer and a plurality of monitoring units, each located at a respective container site. The invention also relates to systems for permitting user-modified polling of such monitoring units.

BACKGROUND OF THE INVENTION AND TECHNICAL PROBLEMS POSED BY THE PRIOR ART

Much effort has been invested to provide efficient and economical systems for facilitating waste collection from a network of waste containers. Typically, one or more waste collection service providers, or haulers, will service a waste container network that includes a large number of waste containers situated at different geographical locations in a given region. Usually, these containers are provided with a compacting device equipped with a hydraulic ram for compacting the trash or, they may consist of open-top containers which are not equipped with a compacting device. When a container becomes full, a hauler, typically a large truck, is dispatched to the site to empty the container. Since each hauler trip typically involves significant cost, and since the amount of waste generated at a particular location typically varies in an unpredictable manner, the status of each container in the network is usually monitored in some way to ensure that haulers are dispatched to full containers in a timely and economical manner.

It is known to provide waste container monitoring systems that employ a respective processing or monitoring unit and a respective communications link associated with each waste container. Such systems are disclosed in U.S. Pat. No. 5,303,642, the entire writing and subject matter of which are incorporated herein by reference. These systems detect container fullness by monitoring-the maximum pressure applied to the hydraulic ram during a compaction stroke. The monitoring unit includes a microprocessor for making a container status, i.e., fullness or emptiness, determination. When a full or empty container determination is made, the monitoring unit initiates an outbound call and a signal representing the container status is communicated via communications link to a remote central location. For example, the monitoring unit initiates an outbound call when it determines that the associated container is full and sends a facsimile message to a remote location to indicate to a human administrator that a particular container is full or empty.

Other prior art systems, such as those disclosed in U.S. Pat. No. 5,016,197, provide an automated trash management system to monitor the fullness of a plurality of trash compactor/container units based upon an analysis of the number of cycles of the compactor and the hydraulic pressure associated therewith. Such systems utilize a monitoring unit that includes a pressure sensing unit associated with each waste container. The monitoring unit transmits data, representing instantaneous hydraulic pressures, to a central computer via communications link, such as a telephone system. The central computer determines the fullness of each trash compactor based on the transmitted pressure data. The computer may compile a database for each trash compactor and compactor fullness may be determined from the database.

As waste container networks grow in size, the management of the status information provided for each container in the container network becomes increasingly difficult. A human administrator of the container network is presented with and/or required to manage a great deal of information. Thus, a determination of which containers require immediate attention, i.e., which containers require emptying or are experiencing an error condition, often becomes overly burdensome. Accordingly, those of ordinary skill in the art will recognize a need for a system for facilitating the efficient management of a waste container network by providing comprehensive information in a manner that permits a human user to quickly and accurately determine the status of all containers in a container network. Moreover, there is a need for a system that is versatile in that it is compatible with monitoring units which make a fullness determination at the container site and with monitoring units which provide information used to make a fullness determination at a central computer.

Another problem with prior art waste container management systems is that they do not provide for real-time dynamic updating of container status. Nor do they provide for user-controlled polling of the containers in the network. For example, in systems such as the one disclosed in U.S. Pat. No. 5,016,197, where pressure readings are conveyed to a central computer, the central computer typically conducts polling of a particular container according to a preset and rigid schedule. Thus, in cases where a user desires immediate information about a container's status, the information is not readily available until the container is polled by the system. Another related consequence of the prior art polling techniques is that the information presented to the user may not be accurate or up to date. Thus, it would be desirable to provide a waste management system which provides for real-time dynamic updating of container status and which permits a user to modify or control the polling schedule associated with particular containers.

Yet another problem with prior art waste container management systems is that they do not provide for efficient updating of container status information. In a typical prior art container network, the monitoring units will typically be adapted to make outbound calls to a central computer to report container status information. In addition, the central computer may be adapted to make outbound calls according to an automatic polling routine to update container status. However, if outbound calls are being made, the receipt of an inbound call from a full container in prior art systems may be prevented or delayed, especially in systems that provide only a single communications channel, resulting in outdated information being presented to the user. Thus, the prior art does not provide an efficient method for managing inbound and outbound calls in a manner that provides for efficient updating of container status information. Accordingly, there is a need for such a system.

SUMMARY OF THE INVENTION

The benefits and advantages described above are realized by the present invention which provides a system for remotely managing a network of waste containers in a container network which provides comprehensive container network information to a user in a manner that enables the user to quickly and accurately determine the status of all containers in the container network. In a preferred embodiment, the invention provides a central computer having a communication link to each of the monitoring units for the respective containers in the container network. Communications with the monitoring units in the container network are managed by a communications module on the central computer. The central computer is adapted to provide a dynamically updated display which distinguishes full containers from other containers in the network. In a preferred embodiment, the invention provides a graphic display with a full container window or zone in which identifiers for the full containers displayed, along with other information, such as container location, pressure and compaction readings, account information and contact information for the waste collection service or hauler associated with the container. The display is provided by a display module in conjunction with a full container module which cooperates with a container database to determine which containers in the container network have reported full status and periodically redraws the full container zone or window to provide an updated list of full containers.

The container database preferably includes a container table and a transaction table. The container table is a relatively static database containing a container record for each container in the network. Each container record includes a container identifier and various information associated with the container, including operating parameters, accounting information and geographical location. In a preferred embodiment, the container record includes a full status flag which is used to indicate whether a fullness determination has been made by the monitoring unit associated with the container and communicated to the central computer. Alternatively, the container record may include a pressure threshold and a fullness determination may be made at the central computer. The transactions table is a relatively dynamic database and contains transaction records resulting from each communication session attempted or established with a monitoring unit in the container network. Each transaction record contains information identifying the associated container, as well as information identifying the type of transaction resulting from the communication attempt with the monitoring unit associated with the container.

The invention also provides an alarm zone or window for distinguishing to the user which containers in the container network have an alarm condition. The transaction table is adapted to contain transaction types that include errors that occur during communication attempts. An alarm module cooperates with the transaction table to determine which containers have an alarm condition and, in conjunction with the display module, provides a graphic display listing identifiers for the containers with an alarm condition. Like the full container module, the alarm module periodically reviews the container database and updates the alarm zone or window to reflect the current status of the containers in the container network.

The invention also provides a container status zone or window for displaying the non-full containers which do not have an alarm condition. A container status module cooperates with the transaction table to determine which containers are neither full nor have an alarm condition and, in conjunction with the display module, provides a graphic display listing identifiers for the containers that are neither full nor have an alarm condition.

The full container zone, alarm zone and container status zone of the invention provide a simple and efficient way for an operator to quickly determine the status of all containers in the container network. Moreover, the full container zone distinguishes full containers from the rest of the containers in the container network such that the user may quickly determine which containers are in need of emptying. Similarly, the alarm zone distinguishes containers having an alarm condition from the rest of the containers in the network and permits quick determination by a user of containers experiencing an error condition.

According to yet another feature of the invention, automatic polling may be scheduled by the user. Polling involves an outbound call or communication initiated by the central computer to the monitoring unit for a selected container in the container network. A polling module provides a user interface to enable a user to enter polling parameters and the polling module updates the container database accordingly. The container records stored in the container table preferably contain fields for an automatic polling flag and a polling interval. The polling module accepts user input and stores the appropriate automatic polling data in the container record. The communications module is adapted to periodically review the container table and schedule polling sessions according to the parameters in the automatic polling flag and polling interval fields in the container records. Preferably, the polling sessions are queued into a session stack on a first-in-first-out basis. In this manner, the user can control the polling interval for each container in the container network. Moreover, the session stack permits scheduled polling sessions, as well as on-demand polling sessions requested by the user, to be queued such that the user need not be present for the polling sessions to be performed. The communications module conducts polling of the containers in the network in a manner that is preferably transparent during the user's observation of the full container zone, container status zone and alarm zone. The communications module is preferably implemented as a communications thread that is separate from and executed in the background relative to the main thread of execution represented by the operation of the full container module, container status module and alarm module.

According to yet another feature of the invention, the communications module is adapted to manage the scheduling and execution of polling sessions while permitting the receipt of inbound full or empty calls initiated by monitoring units in the container network. The communications module provides a waiting period or delay between the execution of scheduled polling events to permit receipt of inbound calls. Preferably, the receipt of an inbound call preempts the polling events already. queued in the session stack such that the calling session associated with the inbound call is performed immediately. This ensures that inbound calls from monitoring units, for example, inbound calls indicative of a full container in the network, result in immediate updating of the container database and immediate appropriate updating of the full container zone, container status zone or alarm zone.

Numerous other advantages-and features of the present invention will become readily apparent from the following detailed description of the invention, from the claims, and from the accompanying drawings.

BRIEF DESCRIPTION OF THE DRAWINGS

In the accompanying drawings that form part of the specification, and in which like numerals are employed to designate like parts throughout the same.

FIG. 9 depicts a flow chart showing the steps performed by an exemplary communications module and polling module to create poll sessions according to the invention;

FIG. 12 is a diagrammatic illustration representing a data exchange between a monitoring unit and a central computer during a polling session in an exemplary system according to the invention.

DETAILED DESCRIPTION OF THE PREFERRED EMBODIMENT

While this invention is susceptible of embodiment in many different forms, this specification and the accompanying drawings disclose only some specific forms as examples of the invention. The invention is not intended to be limited to the embodiments so described. The scope of the invention is pointed out in the appended claims.

Figure 1:
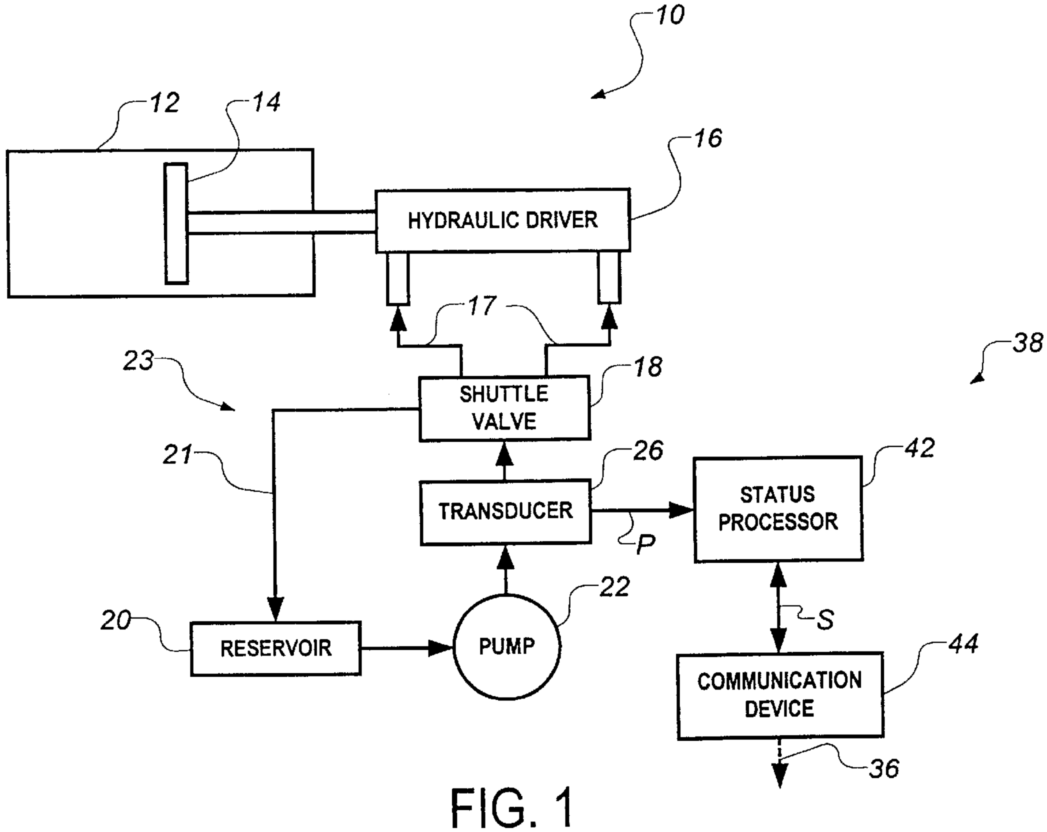
FIG. 1 is a block diagram showing the basic elements of a waste compacting unit according to a preferred embodiment of the invention.

Referring to FIG. 1, a typical waste container, generally depicted by the reference numeral 10, includes a container 12, equipped with a compacting assembly having a hydraulic driver 16 which includes a ram 14, to compact waste received in container 12. The hydraulic driver 16 receives pressurized hydraulic fluid via hydraulic lines 17 to effect reciprocal movement of the ram 14 in a controlled manner using a shuttle valve 18. Hydraulic fluid is stored in a reservoir 20 which provides pressurized hydraulic fluid to the shuttle valve 18 and which is returned from the shuttle valve 18 via a return line 21. As will be recognized by those of ordinary skill, the reservoir 20, pump 22, shuttle valve 18 and return line 21 form a hydraulic circuit 23. The aforementioned container structure is well known in the art and the details thereof, which are set forth in U.S. Pat. No. 5,303,642, are not necessary for an understanding of and do not form a part of the present invention.

A monitoring unit, generally referenced by the numeral 38, provides an indication of the status of container 10. For example, the monitoring unit 38 may comprise a pressure transducer 26 disposed in the hydraulic circuit 23 at the outlet of the pump 22 to generate a signal (P) representing the hydraulic pressure being applied to the hydraulic driver 16. The signal (P) is conveyed to a status processor 42, which preferably includes a microprocessor based computer executing appropriate instructions for determining container status based on the signal (P) and generating a container status signal (S), representing status information associated with the container 10. For example, the monitoring unit 38 may determine container status locally according to the method disclosed in U.S. Pat. No. 5,303,642 by determining the maximum pressure experienced by the transducer 26 during a compaction stroke of the ram 14, wherein the container status signal (S) represents a status flag indicating the full status of the container. Alternatively, the monitoring unit 38 may operate according to the system described in U.S. Pat. No. 5,016,197 and provide status information representative of hydraulic pressures historically applied to the hydraulic driver 14, wherein the status information is communicated to a central computer and the container status is determined remotely from the container. The monitoring unit 38 also includes a communication device 44, such as a modem, in communication with the status processor 42 through a communications interface 32. Communications device 44 conveys the status signal (S) via a communications link 36, which may comprise a wire-based communication system, such as a telephone network, or a wireless communication system.

Figure 2:
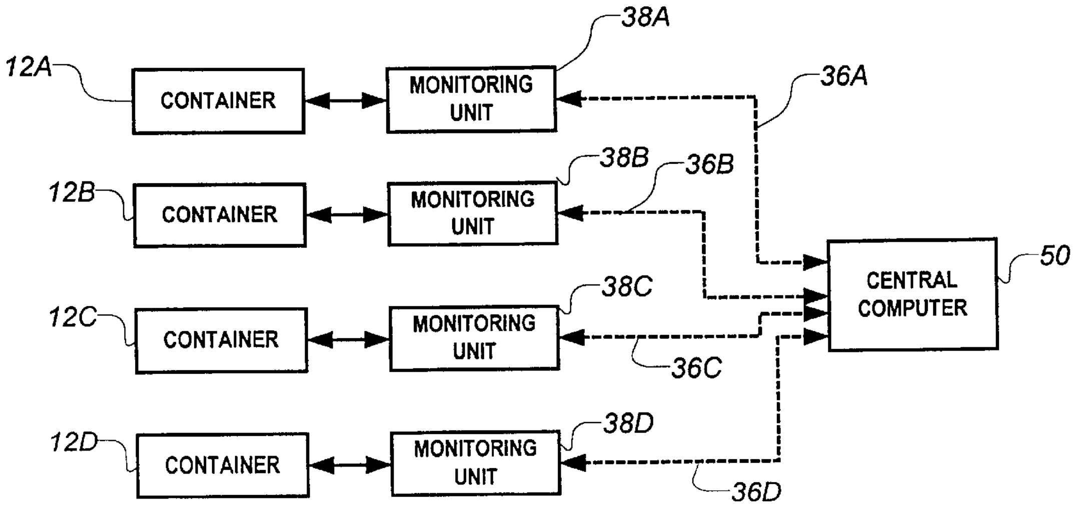
FIG. 2 is a block diagram of a waste container network according to a preferred embodiment of the invention.

FIG. 2 illustrates an exemplary container network according to a preferred embodiment of the present invention. A number of containers 12A, 12B, 12C and 12D, each having respective monitoring units 38A, 38B, 38C and 38D communicate with a central computer 50 via communication links 36A, 36B, 36C and 36D. It will be understood by those of ordinary skill in the art that the present invention is applicable to container networks having more than four containers and respective monitoring units. Typically, the number of containers in a container network may exceed one hundred.

Figure 3:
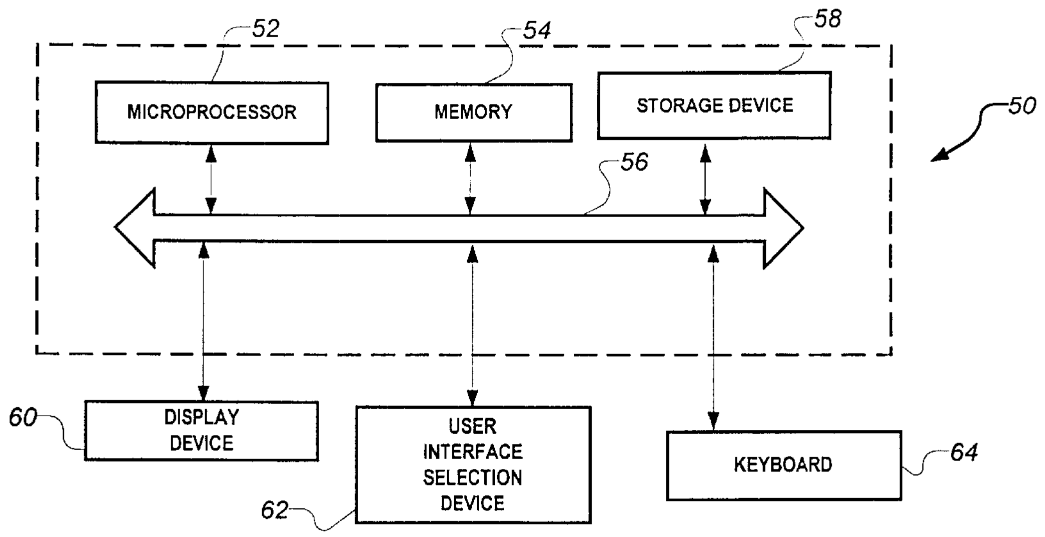
FIG. 3 is a block diagram of the basic components of a computer suitable for implementing an exemplary system according to a preferred embodiment of the invention.

FIG. 3 illustrates the basic components of an exemplary central computer 50 suitable for implementing the system according to the invention. The central computer 50 includes a microprocessor 52 and memory 54, interconnected for electrical communication through a system bus 56. A storage device 58, which may typically include well-known storage devices, such as magnetic or optical disks, is also in communication with system bus 56. As is well-known in the art, memory 54 will contain digital data representing instructions for microprocessor 52. Storage device 58 may also include such instructions or data. Computer 50 also includes user-interface devices for enabling a user to interact with the computer 50. A display device 60, which typically comprises a cathode ray tube or liquid crystal display, communicates with the system bus 56 and displays graphical information to the user according to instructions executed by the microprocessor 52. A user interface selection device 62 also communicates with the system bus 56 and may include a mouse or other pointing device. A keyboard 64 is also in communication with the system bus 56 to permit user-entry of alpha-numeric information.

Figure 4:
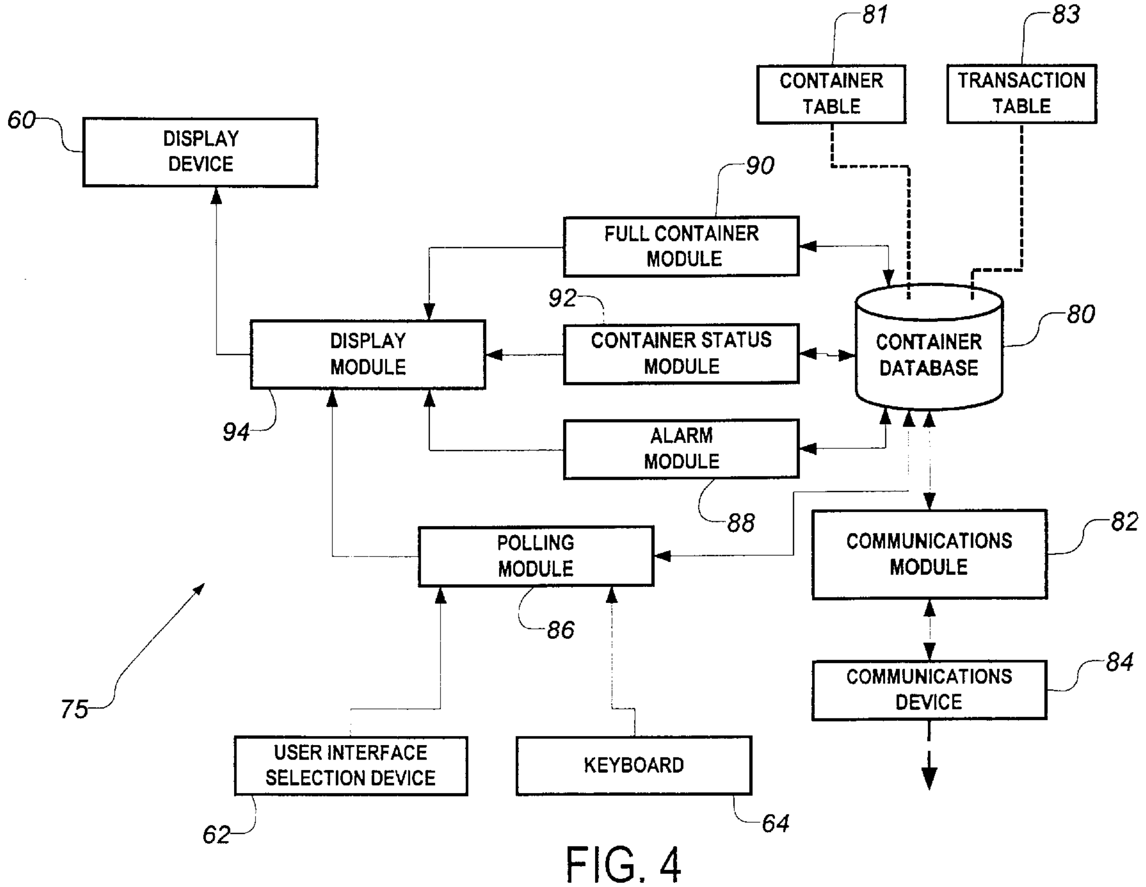
FIG. 4 is a block diagram depicting the relationships between the various modules and databases associated with an exemplary embodiment of the present invention.

FIG. 4 illustrates the basic components or modules of an exemplary system according to the invention. Those of ordinary skill in the art will understand that these modules or components are preferably implemented as a series of instructions for microprocessor 52 and stored in a computer-readable medium, such as memory 54 or storage device 58.

An exemplary system 75 according to the invention, includes a container database 80 that contains various information relative to each of the containers in the container network. The container database is preferably a relational database compatible with a commercial relational database management application such as "ACCESS" developed by Microsoft Corporation, of Redmond, Washington. It will be understood by those of ordinary skill that the container table 81 and a transactions table 83 described herein are preferably in the form of separate but related databases contained in the generically referenced container database 80.

The container table 81 includes a number of container records corresponding to the number of containers in the container network. Each record contains various kinds of information associated with the respective container, as will be explained below. The container database also preferably includes a transaction table 83, including a number of transaction records, each reflecting a transaction conducted relative to one of the containers in the container network as will be explained in more detail below. A transaction record is created in the transactions table 83 by the communications module 82 each time a communications session is established with a monitoring unit 38 in the container network. Thus, the container database 80 is kept updated by the communications module 82, which interfaces with a communication device 84, such as a modem, and which manages communications sessions with the monitoring units 38 in the container network.

A full container module 90 retrieves information from the container database 80 and provides a signal to a display module 94, which contains appropriate instructions and drivers to provide a signal readable by the display device 60. Full container module 90 in conjunction with display module 94 preferably function to generate a full container window or zone displaying a list of the full containers in the container network, as will be explained in more detail below. The full container module 90 is adapted to determine when new transaction records have been created and to send appropriate signals to the display module 94 to update the list of full containers displayed in the window or zone.

An alarm module 88 retrieves information from the container database 80 regarding containers that have an alarm condition. For example, an alarm condition may occur when a status signal has not been or cannot be received from a particular container in the container network. In conjunction with display module 94, alarm module 88 displays an alarm window or zone listing containers which have an alarm or error condition, as will be explained in more detail below.

A container status module 92 retrieves information from the container database 80 regarding the status of all containers in the container network which are not full or which do not have an alarm condition. The container status module 92, in conjunction with display module 94, displays a window or zone which depicts the status of non-full containers that do not have an alarm condition, as will be explained in more detail below.

An exemplary container table 81 includes a number of container records with each record corresponding to a container in the container network. Each record in the container table 81 includes a number of fields containing various information relative to the container associated with the record. An exemplary container record is depicted below in TABLE A, with field names and an explanation of the information stored in the respective fields.

TABLE A

| Container Record Field Name | Description |
|---|---|
| CONTAINER ID | A numeric identifier for the container. |
| UNIT NAME | A user-assigned name given to the container. |
| AUTO-POLL INTERVAL | A numeric value that indicates the interval at which automatic polling is set to occur. |
| AUTO-POLL FLAG | A flag that indicates whether automatic polling has been designated for this container. |
| FULL STATUS FLAG | A flag that indicates whether or not the monitoring unit associated with the container has reported a full condition. |
| FULL STATUS ACKNOWLEDGMENT FLAG | Indicates whether the operator has acknowledged the full status of the container. |
| SOFTWARE SERIAL NUMBER | Indicates the serial number or version of the software/firmware running on the monitoring unit associated with the container. |
| CONTAINER SITE ID | An identifier reflecting the container site. |
| REGION ID | An identifier for a user-defined region in which the container is located. |
| ACCOUNT ID | An identifier for a billing account associated with the container. |
| HAULER ID | An identifier for a hauler contracting to empty the container. |
| CONTAINER PHONE NO | A telephone number for contacting the monitoring unit associated with the container |
| SERVICE CO. ID | An identifier for the service company associated with the container. |
| CONTAINER MFR | An identifier for the manufacturer of the container |
| CONTAINER MODEL | An identifier for the model of the container. |
| MONITORING UNIT STATUS ID | An identifier reflecting the status of the monitoring unit associated with the container. |
| USER NOTE | A field for user-entered notes associated with the container |
| EMPTY PRESSURE | A numeric value for an empty pressure threshold associated with the container and set during the commissioning process. |
| FULL PRESSURE | A numeric value for a ful pressure threshold associated with the container (set during the commissioning process). |
| ¾ PRESSURE | A numeric value for a ¾ pressure threshold associated with the container (set during the commissioning process). |
| ½ PRESSURE | A numeric value for a ½ pressure threshold associated with the container (set during the commissioning process). |

TABLE A-continued

| Container Record Field Name | Description |
|---|---|
| ¼ PRESSURE | A numeric value for a ¼ pressure threshold associated with the container (set during the commissioning process). |
| REQUIRED FULL COMPACTIONS | A numeric value for the number of full compactions to be detected before the container is determined to have a full condition (set during the commissioning process). |
| REQUIRED EMPTY COMPACTIONS | A numeric value for the number of full compactions to be detected before the container is determined to have an empty condition (set during the commissioning process). |
| INTER-COMPACTION DELAY | A numeric value designating the time between compactions (set during the commissioning process). |
| PRIMARY PREAMBLE | A first DTMF digit used by the monitoring unit to access an outside phone line. |
| SECONDARY PREAMBLE | A DTMF digit used by the monitoring unit to access an outside phone line. |
| PRIMARY PHONE NUMBER | A primary phone number the monitoring unit dials upon a change in status (e.g. full or empty). |
| DIAL SECONDARY FLAG | A status flag indicating whether or not the monitoring unit makes second call. |
| SECONDARY PHONE NUMBER | A secondary phone number the monitoring unit dials upon a change in status. |
| LAST CONTACT TIME | The date and time the last communication was established with the container. |
| PULL COST | The cost associated with an emptying operation for the container. |
| PULL PRICE | The price charged for emptying the container. |
| CURRENT PRESSURE | A numeric value reflecting the latest pressure reading by the monitoring unit associated with the container. |
| CURRENT COMPACTIONS | A numeric value reflecting the number of compactions determined by the monitoring unit since the last container pick-up. |
| AVERAGE COMPACTIONS | A numeric value reflecting the average number of compactions undergone between container emptying and a full container determination |
| PICK UPS | The number of pick-ups performed by a hauler for the container. |
| TOTAL COMPACTIONS | The total number of compactions performed on the container. |
| COMMISSION DATE | The most recent date that a commissioning process was performed on the container. |
| INSTALL DATE | The date the container was installed at the site. |
| FIRMWARE VERSION | The version of the firmware in the monitoring unit associated with the container. |

It will be recognized that a record in the format of the one depicted in TABLE A will be stored in the container database for each of the containers in the container network.

It will be noted that some of the container record fields described in TABLE A refer to a "commissioning process." Although not limited to use in such container network systems, the invention is adaptable to container network systems such as those described in U.S. Pat. No. 5,303,642 where the monitoring units 38 may be commissioned from a remote location. The term "commissioning" refers generally to a process by which internal settings, such as values designating full pressure thresholds, of the monitoring unit are modified from a remote location. Since such systems make a container fullness determination at the container site, it is useful to provide for the remote modification of criterion used to make the fullness determination, for example, the maximum compactor pressure permitted before a full determination is made.

Referring again to TABLE A above, in applications where some or all of the containers in the container network are equipped with compactors, the container table may contain data representing certain pressure thresholds that are set during the commissioning process for that particular container. For example, the full pressure setting, empty pressure setting, ¾, ½ and ¼ pressure thresholds may be stored in the container table. A commissioning process may be performed by the central computer in which the stored values are communicated to the monitoring unit for the associated container so that ¾, ½ and ¼ pressure flags may be set on the monitoring unit and conveyed to the central computer. Typically, the commissioning process will involve a data exchange, which may involve an ASCII or similar protocol to communicate the pressure thresholds to the software or firmware at the monitoring unit in a manner similar to the manner in which container identification and status information are communicated as explained below.

The container database 80 also preferably include a transactions table 83, which contains records of transactions conducted relative to each of the containers in the container network. As will be explained in more detail below, a transaction record is created in the transactions table 83 by the communications module 82 each time a communications session is established, either by a polling session in the form of an outbound call initiated by the communications module or by the receipt of an inbound call initiated from a monitoring unit associated with a container in the container network. An exemplary transactions record is illustrated below in TABLE B.

TABLE B

| TRANSACTION RECORD FIELD NAME | DESCRIPTION |
|---|---|
| TRANSACTION ID | A numerical value signifying an internal transaction identifier assigned by the communications module (for example, sequential integers). |
| CONTAINER IDENTIFIER | A numerical value identifying the monitoring unit associated with the transaction. |
| MONITORING UNIT SERIAL NUMBER | An identifier for the monitoring unit associated with the transaction. |
| DATE STAMP | The date and time of the transaction. |
| TRANSACTION TYPE IDENTIFIER | An identifier of the type of transaction. |
| PRESSURE READING | A pressure reading obtained during the transaction. |
| COMPACTION COUNT | A compaction count obtained during the compaction. |
| WEIGHT | The weight of the container at the time of the transaction. |

As described above, e each transaction record preferably includes a field named TRANSACTION TYPE IDENTIFIER which contains data, either a text string or, alternatively a numeric code, representing the type of transaction, or the type of error occurring as a result of a communications session. An exemplary listing of transaction type strings suitable for implementing the invention appear in TABLE C below.

TABLE C

| TRANSACTION TYPE STRING | DESCRIPTION |
|---|---|
| FULL | The transaction was created as a result of a full call initiated by the monitoring unit associated with the container. |
| EMPTY | The transaction was created as a result of an empty call initiated by the monitoring unit associated with the container. |

TABLE C-continued

| TRANSACTION TYPE STRING | DESCRIPTION |
|---|---|
| POLLAUTO | The transaction was created as a result of an automatic poliing session scheduled by the user. |
| POLLDEMAND | The transaction was created as a result of an on-demand poll requested by the user. |
| COMMISSION | The transaction was created as the result of a commissioning process performed on the monitoring unit. |
| RESET | A user initiated session forcing the container status to be empty. |
| POLLFULL | The transaction was created as a result of a full container sensed as a result of a polling session. |
| POLLEMPTY | The transaction was created as a result of an empty container senses as a result of a polling session. |
| ERRORFULL | An error occurred during a full call session. |
| ERROREMPTY | An error ocurred during an empty call session. |
| ERRORCALLIN | A container attempted to call but did not finish the session, typically due to excessive phone line noise. |
| ERRORPOLLAUTOBUSY | The line was busy during an automatic polling session. |
| ERRORPOLLDEMAND BUSY | The line was busy during an on-demand polling session. |
| ERRORPOLLAUTO | An error occurred during an automatic polling session. |
| ERRORPOLLDEMAND | An error occurred during an on-demand polling session. |
| ERRORCOMMISSION | An error occurred during a commissioning session. |
| ERRORRESET | A user-initiated reset session was attempted but failed to complete. |
| ERRORBADTRANSDUCER | A bad transducer has been detected on the monitoring unit. |
| ERRORUNKNOWNFULL | An unknown error occurred during a full call. |
| ERRORUNKOWNEMPTY | An unknown error occurred during an empty call. |

Those of ordinary skill in the art will recognize that the transaction table provided by the present invention provides a transaction history of all activity in the container network. As such, the invention provides for the presentation of historical data for a particular container to the user. For example, a graph of historical pressure readings obtained by periodic polls of a particular container may be presented to the user in graphical form by iterating through the transaction table and retrieving transaction records having the AUTOPOLL transaction type for a selected container. These transaction records may be stored in a designated table and a graph generated from the pressure readings and respective date stamps.

In systems adhering to the teachings of U.S. Pat. No. 5,303,642, in which the container fullness determination is made at the container site, an inbound call is initiated by the monitoring unit 38 when the container reaches a full condition. As will be explained in more detail below, the communications module 82 manages the receipt of inbound calls from monitoring units 38 in the container network. The monitoring unit 38 is configured to set a full status flag when a full condition has been determined, based on recent compaction and pressure history and iteration counts. Upon detection of a full condition and setting of the appropriate status flag, the monitoring unit 38 initiates a telephone communication to the central computer 50. When a communications link is established, a communications session occurs and the monitoring unit uploads information about the container status and identification. In addition to receiving the uploaded information, the central computer 50 may request additional information from the monitoring unit 38. For example, a 7-bit ASCII format may be used to communicate commands according to the protocol as represented in TABLE D below.

TABLE D

| Command | Description/Meaning |
|---|---|
| <F01 | The monitoring unit indicates that a "full" command or status flag is set on the container unit designated "01." |
| <C064 | The monitoring unit indicates that the current number of compactions is 064 (hexadecimal) or 100 (decimal). |
| >M | The central computer requests the current pressure from the status monitor. |
| <M56 | The monitoring unit responds that the current pressure is 80 (hexadecimal) or about 1000 psi. |

In accordance with an primary feature of the invention, the compactor database is dynamically updated with information from the container network received by the communications module 82, which is adapted to receive inbound communications initiated at container sites and which, in a polling operation, is also adapted to initiate outbound communications to one or more containers in the container network. Communications module 82 cooperates through a communications interface with a communications device 84, such as a modem, to receive and transmit data. A polling module 86 provides for user-modified polling actions in a manner that will be explained in more detail below.

Figure 5:
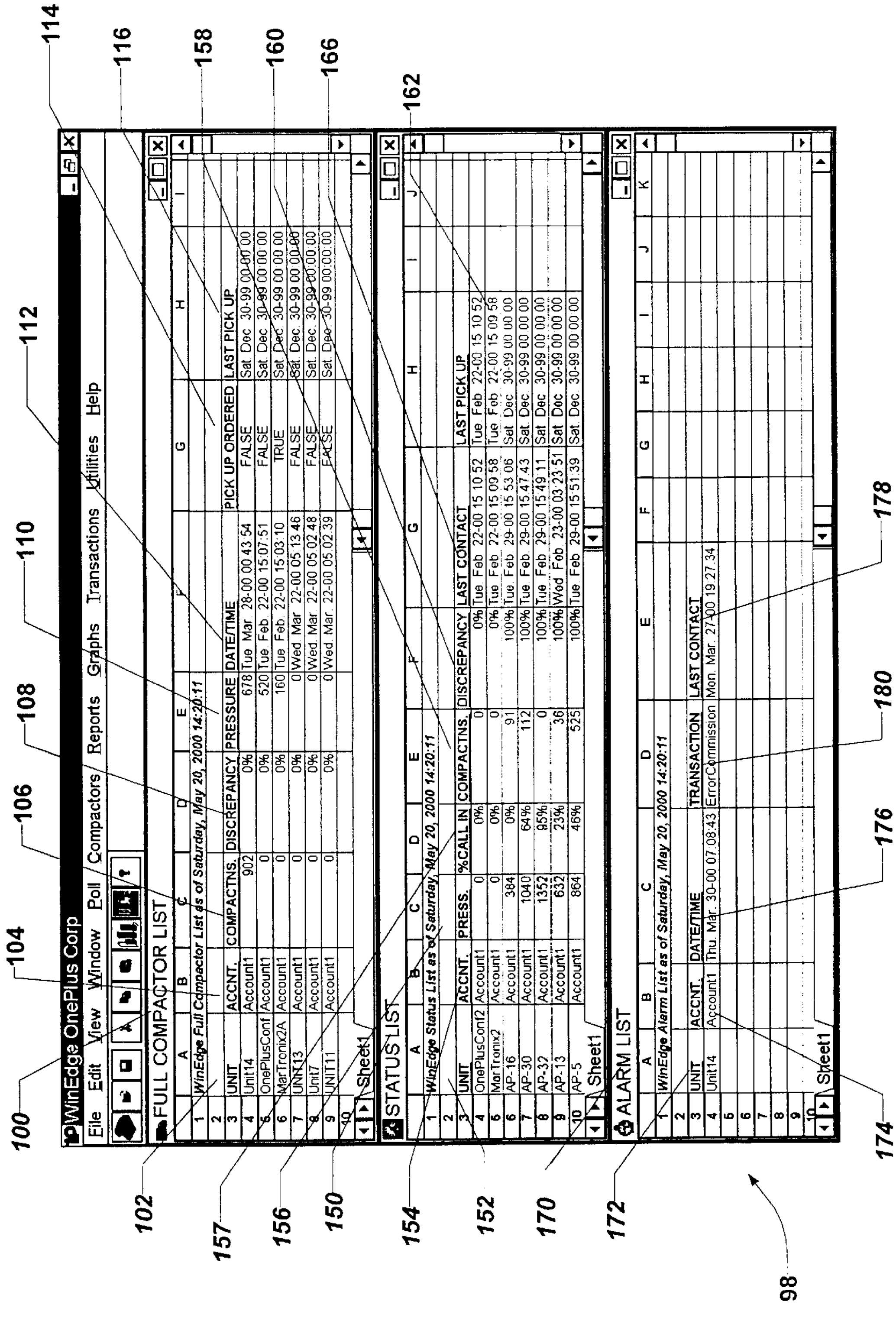
FIG. 5 depicts an exemplary display of a full container zone, a container status zone, and an alarm zone according to a preferred embodiment of the present invention.

Referring to FIG. 5, there is illustrated an exemplary display generated by display module 94 in conjunction with the full container module 90, container status module 92 and alarm module 88. An exemplary graphical representation of a full container zone preferably takes the form of a full container window 100 displaying a listing of full containers in a spreadsheet format. In accordance with well known operating systems, the full container zone 100 may be displayed within a main window 98. Full containers are identified by a unit identifier presented in a UNIT column 102. The unit identifier may be a text string assigned by the user. An account column 104 provides information regarding the business account associated with respective unit identifiers. A compactions column 106 contains information regarding the number of compactions performed on the container by a compacting apparatus, such as that described with respect to FIG. 1. The compactions information may be provided to the container database 80 through the communications module 82 which may receive an inbound call or data signal from a monitoring unit 38 associated with the container to indicate the number of compactions performed on the container. A discrepancy column 160 provides information regarding the discrepancy existing between the current number of compactions and a running average of compactions required for a "full" event. The discrepancy column 160 provides an indicator in the container status zone or window of an impending "full" condition so as to facilitate an early pick up if so desired by the user. For example, the discrepancy may be calculated as follows:

DISCREPANCY=[(Average No. of Full Compactions−Current No. of Compactions)/Average No. of Full Compactions]×100

A pressure column 110 displays values representing the last hydraulic pressure measured in the hydraulic circuit associated with the ram of a compactor for a respective container. Pressure values are determined from the container database which is dynamically updated, as will be explained below, with data from the monitoring unit associated with the respective compactor. A date/time column 112 displays the data and time that the last pressure and compactions data were obtained. A pick-up ordered column 114 contains information representing to the user whether a pick-up has been scheduled for the particular container. A last pick-up column 116 displays information for the user's reference as to when the last pick-up occurred for the particular container. Those of ordinary skill will recognize that the full container zone 100 provides a visual indication to the user as to which containers in the container network are in need of being emptied.

As will be appreciated, some container monitoring units, such as those disclosed in U.S. Pat. No. 5,303,642, make a container fullness determination on-site, at the location of the container, and provide a fullness indication signal via communications link. Upon detection of a "full" condition, such monitoring units initiate a phone call to the central computer 50 and convey a full command to the central computer. Thus, when applied to container networks in which the monitoring units initiate a "full" call to a central location, the invention provides for a full container zone 100 that displays identifiers and other operational information associated with containers, the monitoring units of which have initiated "full" calls. Alternatively, where the invention is applied to container networks in which the monitoring units provide pressure data to a central location and a fullness determination is made at the central location, the full container zone 100 may be used to provide a visual indication of full containers based on fullness determinations made at the central computer 50.

Still referring to FIG. 5, in accordance with another feature of the invention, a container status zone or window 150 is also displayed to the user within the main window 98. An exemplary graphical representation of container status zone 150 preferably takes the form of a container status window displaying a listing of containers in the container network in a spreadsheet format. In a manner similar to the full container zone 100 described above, the container status zone 150 provides a unit identifier column 152, an account information column 154, a pressure reading column 156, a % CALL IN column 157, a compactions column 158, a discrepancy column 160, a last contact column 166, and a last pick-up column 162. The % CALL IN column 157 provides an indication of the percentage represented by the current pressure compared to a threshold "call-in" pressure. The "call in" pressure represents a pressure value at which a fullness determination is made by the monitoring unit 38. The last contact column 166, indicates to the user when the last contact was made relative to the listed containers.

Also illustrated in FIG. 5 and in accordance with another feature of the invention, an alarm zone or window 170 is provided for depicting to the user a list of containers in the container network which are currently experiencing an alarm condition. Such alarm conditions may include a failure of a particular monitoring unit in the container network to report (or make an inbound call) to the central computer or a failure of a pressure transducer in the monitoring unit associated with a particular container. This alarm information is provided to the container database by the monitoring units associated with containers in the network. Preferably, this information is obtained during an outbound polling session initiated by the central computer as will be explained below. Alternatively, the monitoring units may be equipped with appropriate control routines to send a signal to the central computer to indicate a particular failure of a component, such as a pressure transducer. A unit identifier column 172, account column 174, date/time column 176 and last contact column 178 are preferably displayed in the alarm zone 170. In addition, a transaction column 180 provides an indicator, such as a text string, for revealing to the user the type of error or alarm experienced with respect to a particular container.

The information presented in the full container zone 100, container status zone 150, and alarm zone 170 is retrieved from the container database 80 by the full container module 90, container status module 92, and alarm module 88, which are adapted to recognize the creation of new transactions in the container database 80 by the communications module 82 or otherwise as will be described. Moreover, as will be described in more detail below, the full container zone 100, container status zone 150 and alarm zone 170 are continuously updated based on information received by communications module 82 and written to database 80. When new data is received, the full container module 90 redraws the full container zone 100 to update the display. Similarly, the container status module 92 redraws the container status zone 150 and the alarm module 88 redraws the alarm zone 170.

Figure 6:
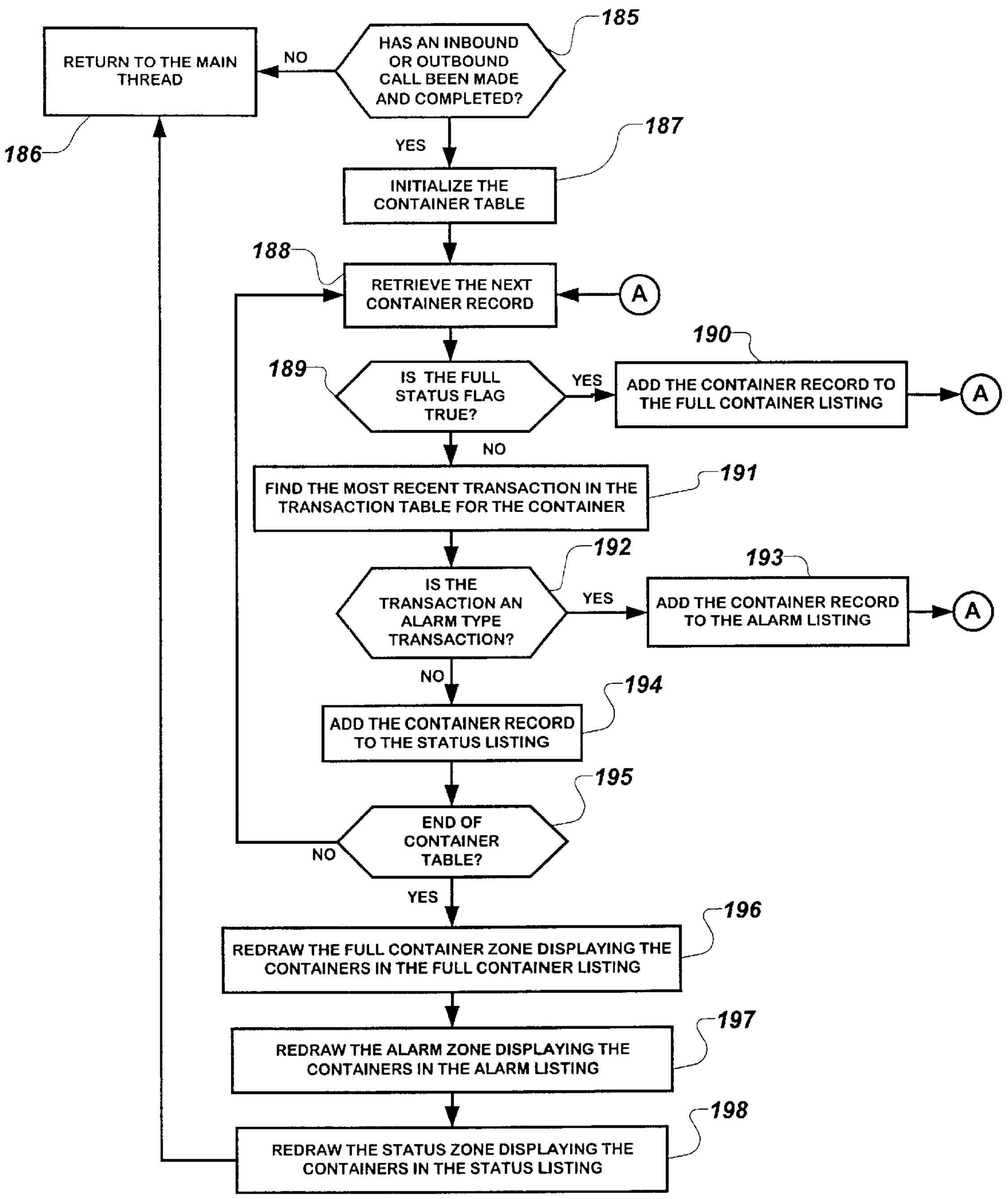
FIG. 6 is an exemplary flow diagram of the steps performed by an exemplary full container module, container status module and alarm module according to the invention to render and update a display such as the one shown in FIG. 5.

FIG. 6 is a flow diagram illustrating the steps of operation of an exemplary process performed by the full container module, status module and alarm module to maintain an updated listing of full containers, container status and containers having an alarm condition, respectively.

The exemplary process is preferably performed upon the completion of an inbound call received from a reporting monitoring unit 38 or upon completion of an outbound call initiated by the communications module 82 as a result of an on-demand poll initiated by the user or as a result of a polling session scheduled by the user. The main thread of execution includes steps to check for the completion of an inbound or outbound call, represented generally at step 185. This check may be implemented, for example, as a program message routed or threaded through the operating system associated with the communications device or modem 84. If it is determined that neither an inbound nor an outbound call has been completed, the process branches to step 186 and returns to the main thread.

If at step 185 it is determined that an inbound or outbound call has been completed, the process initializes the container table, for example, setting a pointer to the first record in the container table, at step 187. At step 188, the next container record (in the case of the first iteration, the first container record in the container table) is retrieved by the full container module 90. At step 189, a determination is made as to whether or not the full status flag, in the field FULL STATUS FLAG in the container record is set to a "true" value, indicating the monitoring unit 38 associated with. the container has reported that the container is full. If so, the process branches to step 190 where the container record is added to a full container listing temporarily stored in memory. The process then returns to step 188 where the next container record is retrieved from the container table.

If at step 189, it is determined that the full status flag of the container record is not true, the process continues to step 191 where the transaction table is examined by the alarm module 88 to determine the most recent transaction associated with the container (i.e., having the identifier for the container in the UNIT IDENTIFIER field). At step 192, a determination is made as to whether the most recent transaction is an alarm type transaction, for example, an ERRORFULL or ERRORBADTRANSDUCER transaction type contained in the TRANSACTION TYPE IDENTIFIER field of the transaction record. If so, the container record is added to an alarm listing temporarily stored in memory at step 193.

The process then returns to step 188 where the next container record is retrieved.

If at step 192, it is determined that the most recent transaction is not an alarm type transaction, then the process continues to step 194 where the container record is added to a status listing temporarily stored in memory. At step 195, the process determines whether or not the end of the container table has been reached. If not, the process branches back to step 188 to retrieve the next container record. If so, the process continues to step 196 where the full container module 90, in conjunction with the display module 94, redraws the full container zone to display the listing of full containers stored in the full container listing. Similarly, at step 197, the alarm module 88 in conjunction with the display module 94, redraws the alarm zone to display the listing of containers stored in the alarm listing. Likewise, at step 198, the container status module 92, in conjunction with the display module 94, redraws the container status zone to display the listing of containers in the status listing. The process then returns to the main thread of execution at step 186.

As will be recognized from the exemplary process described above, a given container in the container network appears in only one place on the display 98. That is, a given container is identified either in the full container zone, the alarm zone or the container status zone. Accordingly, a user may quickly determine which of the containers in the container network are full by viewing the full container zone. which also provides key information as described relative to FIG. 5. Similarly, the existence of any alarm conditions on containers in the network may be quickly determined by viewing the alarm zone. The status of the remaining containers in the container network—those that have neither a full condition or an alarm condition—may be quickly determined from the container status zone. With each instance of an inbound or outbound call, the full container module 90, container status module 92 and alarm module 88 operate to update the display to reflect changes in the status of the containers in the network. Thus, the user is presented with an up-to-date display which permits quick determination of the status of all active containers in the container network.

Figure 7:
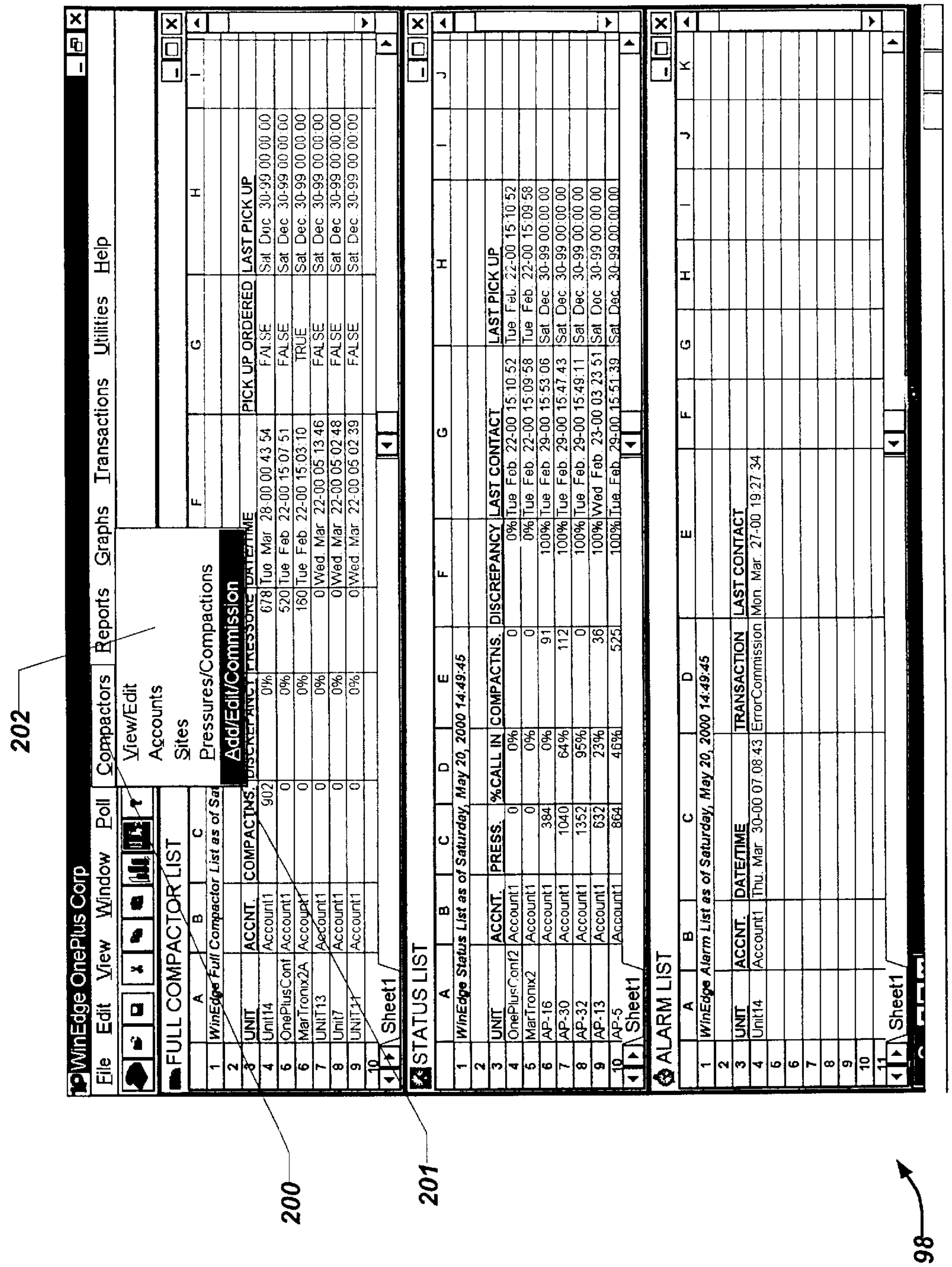
FIG. 7 depicts an exemplary display of a menu option enabling a user to access a container parameter editing function according to a preferred embodiment of the present invention.

Referring now to FIG. 7, according to another aspect of the invention, a user interface is provided for permitting a user to set and modify the automatic polling parameters for particular containers in the container network. In response to user activation of the user interface selection device 62 (FIG. 3), or in response to appropriate alpha-numeric entry through keyboard 64 (FIG. 3), a COMPACTORS feature 200 displayed in the main window 98 may be activated to provide a pull-down menu display 202, which includes an ADD/EDIT/COMMISSION option 201 to enable a user to edit parameters associated with a selected container and to configure automatic polling features for a selected container.

Figure 8:
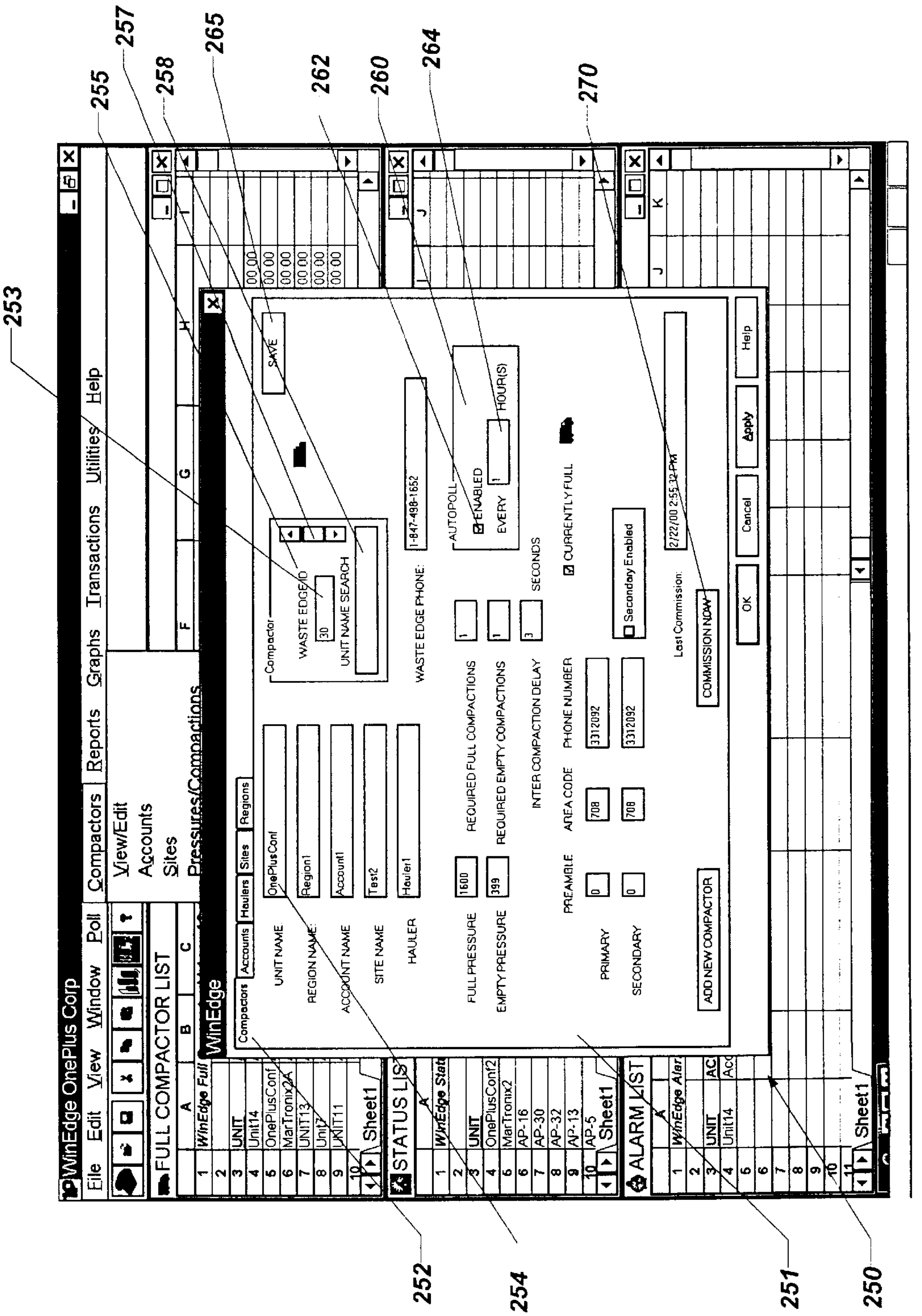
FIG. 8 depicts an exemplary display of a container parameter dialogue window or pane according to a preferred embodiment of the present invention.

When the ADD/EDIT/COMMISSION option 201 is selected by the user, i.e., when the user interface selection device is used to move a pointer over the ADD/EDIT/COMMISSION option 201, the user is presented with the dialogue box or window 250 shown in FIG. 8 for displaying parameters associated with a selected container based on a corresponding record in the container table 81 (FIG. 4). When the COMPACTORS tab 252 is selected by the user, a COMPACTORS dialogue pane 251 is displayed and presents information in the container table 81 in a record associated with a particular container, identified in a UNIT NAME box 254. Other tabs and associated panes may be provided to enable the user to view the container database information in different formats, for example, by account, hauler, site or region. The COMPACTORS dialogue pane 251 also permits a user to view and modify records in the container table 81 (FIG. 4). The user selects the container information to be viewed by inputting an identifier in the WASTE EDGE ID box 253 in a COMPACTOR section 255 of the COMPACTORS dialogue pane 251. A scrolling control 257 permits the user to scroll through a list of container identifiers, or a user may search for a particular container identifier by typing the first few characters of the UNIT NAME associated with the container into a search box 258. When the user inputs or selects a given container identifier in the WASTE EDGE ID box 253, various information in the container record associated with that selected container identifier is retrieved from the container table and displayed in corresponding boxes in the COMPACTORS dialogue pane 251.

In accordance with a primary aspect of the invention, the user may activate or deactivate automatic polling and set the automatic polling interval for a selected container using the AUTOPOLL section 260 of the COMPACTORS dialogue pane 251. For example, as illustrated in FIG. 8, a container identifier "30" appears in the WASTE EDGE ID box and the AUTOPOLL section 260 indicates with a check box 262 that automatic polling is activated for the identified container, that is the AUTO-POLL FLAG (TABLE A) field in the container record is set to a "true" value. An automatic polling interval box 264 indicates the automatic polling interval set in the AUTO-POLL INTERVAL field in the container record. The COMPACTORS dialogue pane 251 permits the user to toggle the AUTO-POLL FLAG by interacting with, i.e., pointing and clicking, on the check box 262. The user may change the AUTOPOLL INTERVAL value by typing an appropriate number in an autopoll interval box 264. The modified fields in the container record may be stored in the container table 81 when the user selects a SAVE control button 265. Thus, the COMPACTORS dialogue pane 251, which may be generated by the polling module 86, or a separate module, in conjunction with the display module 94, permits user-modification of the polling parameters associated with each container in the container network.

As will be recognized from FIG. 8, the COMPACTORS dialogue pane 251 provides for display and modification of other fields in the selected container record. For example, the full pressure, required full compactions, empty pressure and required empty compactions parameters may be modified by user-entry of new values into corresponding boxes. Similarly, the primary and secondary phone numbers that are dialed by the monitoring unit of the given container may be modified. The updated values may be uploaded to the monitoring unit associated with the given container by user-selection of the COMMISSION NOW control button 270, which causes a communications link to be established with the monitoring unit associated with the given container and the appropriate parameters uploaded.

Once the automatic polling parameters have been input by the user for a particular container, automatic polling is facilitated in the background by the communications module 82 by iterating through the container table 81 and creating poll sessions according to the status of the value of the respective AUTO POLL FLAG in each container record. These poll sessions are queued into a stack for execution by the communications module 82 in a manner that will be explained below. FIG. 9 depicts a flow chart showing the steps performed by an exemplary communications module and polling module to create poll sessions according to the invention. The communications module 82 iterates through the container table 81 in a periodic manner, that is, continuously as part of the communications thread running in the background to the main thread in a multi-tasking operating environment. At step 360, the next container record is retrieved from the container table 81. At step 362, the communications module 82 determines whether the AUTO POLL FLAG is set to a true value for the container. If not, the process branches back to step 360 where the next container record is retrieved. If so, the process then determines whether the AUTO POLL INTERVAL for the container has expired at step 364. This determination is preferably made by subtracting the time indicated in the LAST CONTACT TIME field of the container record from the current time and determining if the result exceeds the value specified in the AUTO POLL INTERVAL. If the interval has not yet expired, the process branches back to step 360 where the next container record is retrieved. If, at step 364, it is determined that the interval has expired, a poll session is created for the container at step 366 and at step 368 the poll session is added to or queued into the calling session stack, the operation of which will now be explained.

The communications module 82 preferably manages communications with monitoring units in the container network using a first-in first-out stack in which calling sessions are queued. The term "calling session" as used herein refers to an outbound polling session that is scheduled according to the automatic polling features of the invention, or to an on-demand outbound polling call requested by the user, or to a full or empty inbound call initiated from a monitoring unit 38. When a poll session is created as describe above in reference to FIG. 9, the session is queued into a calling session stack. The communications module 82 then initiates polling calls according to the poll sessions queued into the stack on a first-in-first-out basis. In this manner, in accordance with the advantages and objectives of the invention, a number of polling sessions may be queued into the stack and performed while the central computer 50 is unattended.

Figure 10:
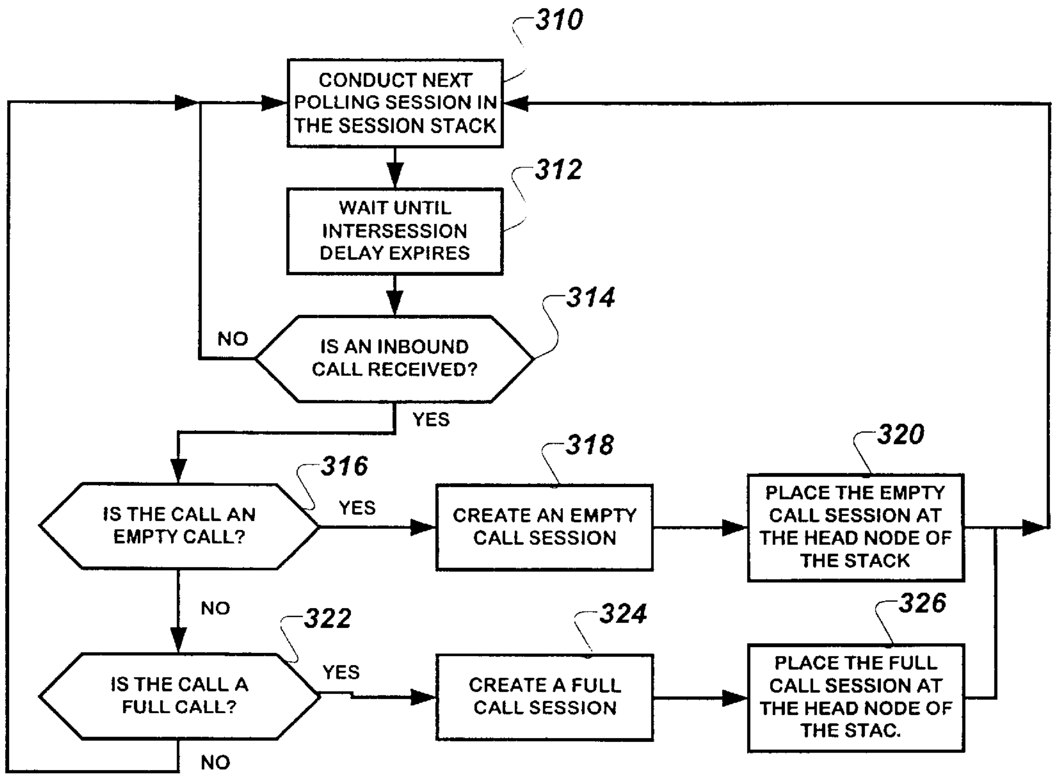
FIG. 10 depicts a flow chart showing the steps performed by an exemplary communications module to permit receipt of inbound calls while conducting calling sessions scheduled in a calling session stack according to a preferred embodiment of the invention.
Figure 11:
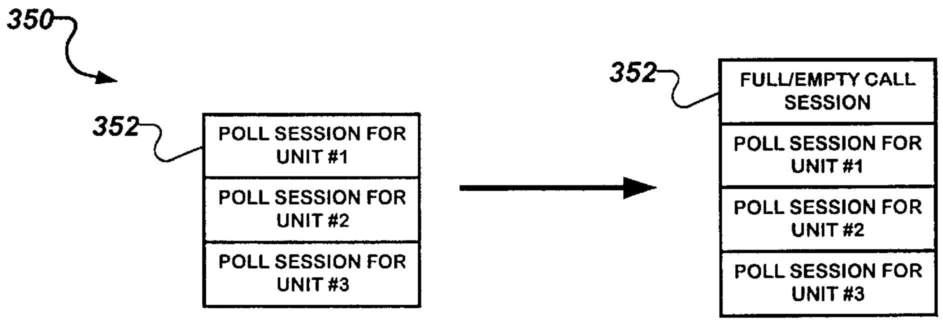
FIG. 11 is a schematic illustration of a session stack used to determine container status according to the invention.

According to another feature of the invention, the communications module 82 is adapted to initiate polling calls while permitting the receipt of inbound calls from monitoring units in the container network. Thus, polling sessions may be scheduled and performed without jeopardizing the receipt of high priority calls, such as inbound calls to indicate full containers. FIG. 10 is a flow chart depicting a process for creating calling sessions in accordance with the invention. At step 310, the next calling session in the session stack is conducted by the communications module 82. At step 312, an inter-session delay is executed in order to permit receipt of inbound calls. At step 314, a determination is made as to whether or not an inbound call is received. If not, the next calling session queued into the session stack is conducted as the process returns to step 310. If, at step 314, an inbound call is received, the communications module 82 next determines, according to the communications protocol described above at step 316, whether or not the inbound call is an empty call. If so, an empty call session is created at step 318 and placed in the calling session stack at step 320. According to a primary aspect of the invention, and as illustrated in FIG. 11, the empty call session is placed at the head node 352 of the session stack 350 so that the empty call session is performed prior to any other calling sessions queued into the stack. In other words, the other calling sessions queued into the stack are preempted by the empty call session. This permits immediate execution of the empty call session so that the empty call inbound from the corresponding monitoring unit may be received and the transactions table and container table updated accordingly. After step 320 is performed, the process branches back to step 310 to conduct the next calling session queued into the session stack.

If at step 316, it is determined that the inbound call is not an empty call, the process continues to step 322, where a determination is made as to whether the inbound call is a full call. If not, the process returns to step 310 to conduct the next calling session in the stack. If so, the process creates a full call session at step 324 and places the full call session at the head node of the calling session stack at step 326. In this manner, the full call session is executed in a preemptive manner relative to the other calling sessions queued into the calling session stack to permit immediate receipt of the inbound full call and appropriate updating of the container table and transactions table.

As described briefly above, an exemplary communications session according to the invention involves a sequence of data interchanges or queries between the central computer and one or more of the monitoring units in the container network. Each session preferably involves a sequence of printable text type commands or responses. Each command has an associated retry count and timeout interval. If the retries are exhausted or the timeout interval is exceeded, the session is aborted and a transaction denoting this error condition is created in the transactions table 83.

FIG. 12 illustrates an exemplary dialog for a polling session. Once a communications link is established, commands are transmitted by the central computer 50 using, for example, an ASCII sequence of characters. For example, the central computer 50 may first request the unit number of the container using the command "<U" and the monitoring unit 38 may respond with an ASCII sequence in the form ">U01" to respond with a unit number "01". According to this exemplary protocol, each of the commands illustrated in the left table in FIG. 11, except for the hang-up command, seeks a response in the format as shown in the right table. Moreover, a retry count and timeout interval are assigned to each command in order to provide for the detection of error conditions, due for example to interference or noise in the communications link. If the timeout interval is exceeded, the command transmission is retried. If the retry count is exceeded, an error transaction is stored in the transaction table for the container.

It will be readily apparent from the foregoing detailed description of the invention and from the illustrations thereof that numerous variations and modifications may be effected without departing from the true spirit and scope of the novel concepts or principles of this invention, the scope of which is defined in the appended claims. Although the preferred embodiment has been described with reference to monitoring units, such as those described in U.S. Pat. No. 5,303,642, that make a container fullness determination at the container site, those of ordinary skill in the art will recognize from the foregoing that the primary features of the invention are adaptable to container network systems, such as those disclosed in U.S. Pat. No. 5,016,197, in which fullness determinations are made at the central computer 50. In such an adaptation, the full container module 90 may make a full determination based on a comparison of pressure data communicated by the monitoring units to a maximum value, and the full container display zone updated based on the fullness determination made by the central computer.

It will also be recognized that, while the invention has been described with reference to containers that have compactor assemblies associated with them, the invention is also adaptable to open-top type containers which have no compactor assemblies associated with them. The fullness of such containers may be determined by a human attendant, who would initiate a telephone call to report a full condition. According to the invention, a full call switch may be provided at the container site, preferably as a part of the status monitor, to initiate a full call when activated by a human operator. The telephone number to be called may be programmed from the central computer and previously uploaded to the status monitor during a commissioning session. Alternatively, the human attendant may be provided with a designated number to call when the container needs to be emptied. A voice-activated or telephone key dialing interface could also be provided to enable the human attendant to input information identifying the container to be emptied. The communications module of the present invention would be adapted to create a FULL transaction in the transaction table for the identified container, and the full container module adapted to update the full container display zone to list the full container.

It will also be apparent to those of ordinary skill in the art that invention is applicable to networks which are distributed over a wide area. For example, the invention is applicable to Internet-based systems which monitor the status of a number of containers in a container network.

What is claimed is:

1. A system for dynamically polling containers in a waste container network the waste container network including a plurality of waste containers, each container having associated therewith a monitoring unit for monitoring status information associated with the container and for communicating the status information to a remote location, the system comprising:

a central computer including a computer-readable medium for storing computer-readable instructions thereon, the computer-readable medium comprising:

receiving a user-input polling interval for at least one of the containers;

For each user-input poll-mg interval, creating and storing a polling session in a session stack;

processing one of the polling sessions stored in the session stack;

Waiting a predetermined time for receipt of an inbound call;

processing another of the polling sessions stored in the session stack.

2. The system of claim 1, further comprising receiving a full signal from the monitoring unit associated with a full one of the containers in the container network;

creating a full session in response to receipt of the full signal; and storing the full session in the session stack such that polling of the full container is accomplished prior to any other polling sessions stored in the session stack.

3. The system of claim 1 further comprising the step of prompting a user for the user input polling interval using a graphic display.

* * * * *

UNITED STATES PATENT AND TRADEMARK OFFICE

CERTIFICATE OF CORRECTION

PATENT NO. : 6,453,270 B1
DATED : September 17, 2002
INVENTOR(S) : Martin J. Durbin It is certified that error appears in the above-identified patent and that said Letters Patent is hereby corrected as shown below:

Title page,
Item [60], should read -- Provisional Application No. 60/188,612, filed on Mar. 7, 2000. --

Signed and Sealed this

Seventeenth Day of December, 2002

JAMES E. ROGAN
*Director of the United States Patent and Trademark Office*